(12) United States Patent
Sennett et al.

(10) Patent No.: US 8,323,436 B2
(45) Date of Patent: Dec. 4, 2012

(54) TRANSPARENT, REINFORCED, COMPOSITE FIBER AND ARTICLES MADE THEREFROM

(75) Inventors: Michael Sennett, Sudbury, MA (US); Elizabeth A. Welsh, Westborough, MA (US); Jean M. Herbert, Woonsocket, RI (US); Phillip M. Cunniff, Shrewsbury, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1115 days.

(21) Appl. No.: 11/732,669

(22) Filed: Mar. 28, 2007

(65) Prior Publication Data

US 2008/0241537 A1 Oct. 2, 2008

(51) Int. Cl.
D04H 3/14 (2012.01)
B29C 70/20 (2006.01)

(52) U.S. Cl. ........ 156/181; 156/166; 156/176; 156/178; 156/188

(58) Field of Classification Search .......... None
See application file for complete search history.

(56) References Cited

U.S. PATENT DOCUMENTS

| | | | | |
|---|---|---|---|---|
| 2,346,766 A * | 4/1944 | Land | ............... | 359/491 |
| 3,645,819 A * | 2/1972 | Fujii et al. | ............... | 156/148 |
| 3,862,287 A * | 1/1975 | Davis | ............... | 264/131 |
| 4,079,161 A | 3/1978 | Kile | | |
| 4,097,446 A | 6/1978 | Abolins | | |
| 4,309,487 A | 1/1982 | Holmes | | |
| 4,319,003 A | 3/1982 | Gardlund | | |
| 4,500,384 A * | 2/1985 | Tomioka et al. | ........... | 156/290 |
| 4,578,307 A * | 3/1986 | Niki et al. | ............... | 442/402 |
| 4,804,427 A * | 2/1989 | Paul et al. | ............... | 156/181 |
| 4,997,693 A * | 3/1991 | Sonoh et al. | ............... | 428/46 |
| 5,039,566 A * | 8/1991 | Skubic et al. | ............... | 428/113 |
| 5,397,636 A * | 3/1995 | Miyao et al. | ............... | 428/195.1 |
| 5,556,673 A | 9/1996 | Giraud | | |
| 5,628,946 A * | 5/1997 | Ward et al. | ............... | 264/120 |
| 5,665,450 A * | 9/1997 | Day et al. | ............... | 428/114 |
| 5,733,659 A | 3/1998 | Iwakiri | | |
| 5,759,658 A | 6/1998 | Piekos | | |
| 5,830,548 A | 11/1998 | Andersen | | |
| 5,875,797 A * | 3/1999 | Chiang et al. | ............... | 132/321 |
| 6,630,231 B2 * | 10/2003 | Perez et al. | ............... | 428/297.4 |
| 6,632,864 B2 | 10/2003 | Gorny | | |
| 6,818,306 B2 | 11/2004 | Miller | | |
| 6,889,938 B1 | 5/2005 | Nordman | | |
| 7,014,803 B2 | 3/2006 | Perez | | |
| 7,455,901 B2 * | 11/2008 | Yano et al. | ............... | 428/292.1 |
| 7,648,607 B2 * | 1/2010 | Morin | ............... | 156/148 |
| 2002/0112804 A1 * | 8/2002 | Woods et al. | ............... | 156/73.1 |
| 2004/0012118 A1 * | 1/2004 | Perez et al. | ............... | 264/257 |
| 2007/0034743 A1 * | 2/2007 | Albers et al. | ............... | 244/129.3 |
| 2008/0241537 A1 * | 10/2008 | Sennett et al. | ............... | 428/394 |
| 2010/0011702 A1 * | 1/2010 | Wilenski et al. | ............... | 52/786.1 |
| 2010/0035017 A1 * | 2/2010 | Green | ............... | 428/114 |

* cited by examiner

Primary Examiner — Jill Gray
(74) Attorney, Agent, or Firm — Roger C. Phillips

(57) ABSTRACT

A transparent, reinforced, composite polymeric fiber that has a polymeric body portion made from a first thermoplastic polymer that is transparent to visible light. The fiber includes polymeric reinforcement elements embedded within the polymeric body portion. The polymeric body portion extends between and about the polymeric reinforcement elements. Each polymeric reinforcement element is formed from a second thermoplastic polymer that is transparent to visible light. The peripheral portion and outer surface of the polymeric body portion defines a peripheral portion and outer surface, respectively, of the transparent, reinforced, composite polymeric fiber. A plurality of the fibers are formed into an array that is processed with a consolidation process to form a transparent, reinforced, composite structure.

1 Claim, 3 Drawing Sheets

TRANSPARENT, REINFORCED, COMPOSITE FIBER AND ARTICLES MADE THEREFROM

STATEMENT OF GOVERNMENT INTEREST

The invention described herein may be manufactured and used by or for the Government of the United States of America for Governmental purposes without payment of any royalties thereon or therefor.

BACKGROUND OF THE INVENTION

1. Field of the Invention

The present invention generally relates to transparent, multi-component, reinforced composite fibers that can be used to fabricate transparent reinforced composite articles such as lenses, windows, etc.

2. Description of the Prior Art

A common prior art technique of creating lightweight transparent articles, such as windows and lenses, involves forming a transparent polymer into the desired shape and size of the finished article using processing methods well known to the plastics industry. These processing methods include extrusion, injection molding of thermoplastic polymers, and casting reactive pre-polymer mixtures into molds and subsequent curing into polymers. The aforesaid processing methods result in transparent materials that exhibit the same bulk mechanical properties and performance of the polymer used to make them. Higher performance transparent polymer windows or lenses have been produced by laminating layers of different polymer films together, including laminations of films that have been stretched in one or two dimensions in order to increase the mechanical properties of the polymers being used, and thus increase the mechanical properties of the finished article. The disadvantages of these prior art approaches include limitations to the mechanical properties that can be attained using un-oriented polymers (i.e. extruded, injection molded, cast, etc.) and the limitations to the mechanical properties that can be attained in drawn polymer films. Another prior art technique for creating reinforced transparent articles entails using a glass particle or glass fiber reinforcing element in a polymer matrix wherein the glass and polymer are chosen to have identical or nearly identical indices of refraction to avoid scattering of light passing through the material. One disadvantage of using glass particles or glass fibers as reinforcement elements is the greater density of glass relative to polymers (typically two or three times greater) which results in a significantly heavier part when compared to the weight of a pure polymer article. Additional disadvantages of the aforementioned glass-reinforced approach to manufacturing transparent reinforced polymer articles are the difficulty in matching refractive indices of the various components, and the large difference in coefficients in thermal expansion (CTE) between glasses and polymers that can result in development of significant internal stresses in articles as the temperature changes. Another prior art technique to making reinforced transparent items is to use glass or ceramic as both the matrix and reinforcing filler. These glass/glass and glass/ceramic composites have significantly higher density than composites based on polymers, resulting in heavier finished articles.

What is needed is a new and improved transparent, reinforced composite that addresses the problems and disadvantages of the aforesaid prior art techniques.

SUMMARY OF THE INVENTION

Accordingly, it is an object of the present invention to provide a new and improved transparent, reinforced composite fiber that can be used to fabricate transparent reinforced composite articles such as windows, lenses and other transparent objects.

It is another object of the present invention that the transparent, reinforced, composite fiber be comprised of a transparent, continuous-fiber reinforced polymer composite in which the reinforcing fiber is a transparent polymer.

It is a further object of the present invention that the transparent, reinforced, composite fiber and articles made therefrom have a density that is relatively lower than the density of prior art transparent, reinforced composites.

It is yet another object of the present invention that the transparent, reinforced, composite fiber be capable of being manufactured at reasonable costs.

Other objects and advantages of the present invention will be apparent from the ensuing description and the accompanying drawings.

Thus, in one aspect, the present invention is directed to a transparent, reinforced composite polymeric fiber comprising a transparent polymeric body portion having a peripheral portion that defines an outer surface, and transparent polymeric reinforcement elements embedded within the polymeric body portion such that the polymeric body portion extends between and about the polymeric reinforcement elements. The peripheral portion and outer surface of the polymeric body portion define the peripheral portion and outer surface, respectively, of the transparent, reinforced composite polymeric fiber.

In another aspect, the present invention is directed to a transparent, multi-component, reinforced composite polymeric fiber. The fiber has a polymeric body portion made from a first thermoplastic polymer that is transparent to visible light. The polymeric body portion has a peripheral portion that defines an outer surface. The fiber includes polymeric reinforcement elements embedded within the polymeric body portion such that the polymeric body portion extends between and about the polymeric reinforcement elements. Each polymeric reinforcement element is made from a second thermoplastic polymer that is transparent to visible light. The number of reinforcing elements in each fiber can vary from one to over one thousand. The peripheral portion and outer surface of the polymeric body portion defines the peripheral portion and outer surface, respectively, of the transparent, reinforced, multi-component, composite polymeric fiber. A plurality of the fibers are formed into an array which is then subjected to a consolidation process so as to form a transparent, reinforced, composite structure. The transparent, reinforced, composite structure is then further processed to create articles such as windows, lenses, protective eye wear and glazing for vehicles, aircraft and marine craft.

In a further aspect, the present invention is directed to a method for making a transparent, reinforced composite structure, comprising the steps of providing a plurality of transparent, reinforced composite polymeric fibers wherein each fiber comprises a polymeric body portion having a peripheral portion that defines an outer surface, and polymeric reinforcement elements embedded within the polymeric body portion such that the polymeric body portion extends between and about the polymeric reinforcement elements. The peripheral portion and outer surface of the polymeric body portion defines the peripheral portion and outer surface, respectively, of the transparent, reinforced composite polymeric fiber. The method further includes the steps of arranging the plurality of fibers into an array, and applying heat and pressure to the array to consolidate the array into a transparent, reinforced, composite structure. The transparent, reinforced composite structure has a peripheral region and outer surface that is formed by the first polymer.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 1:
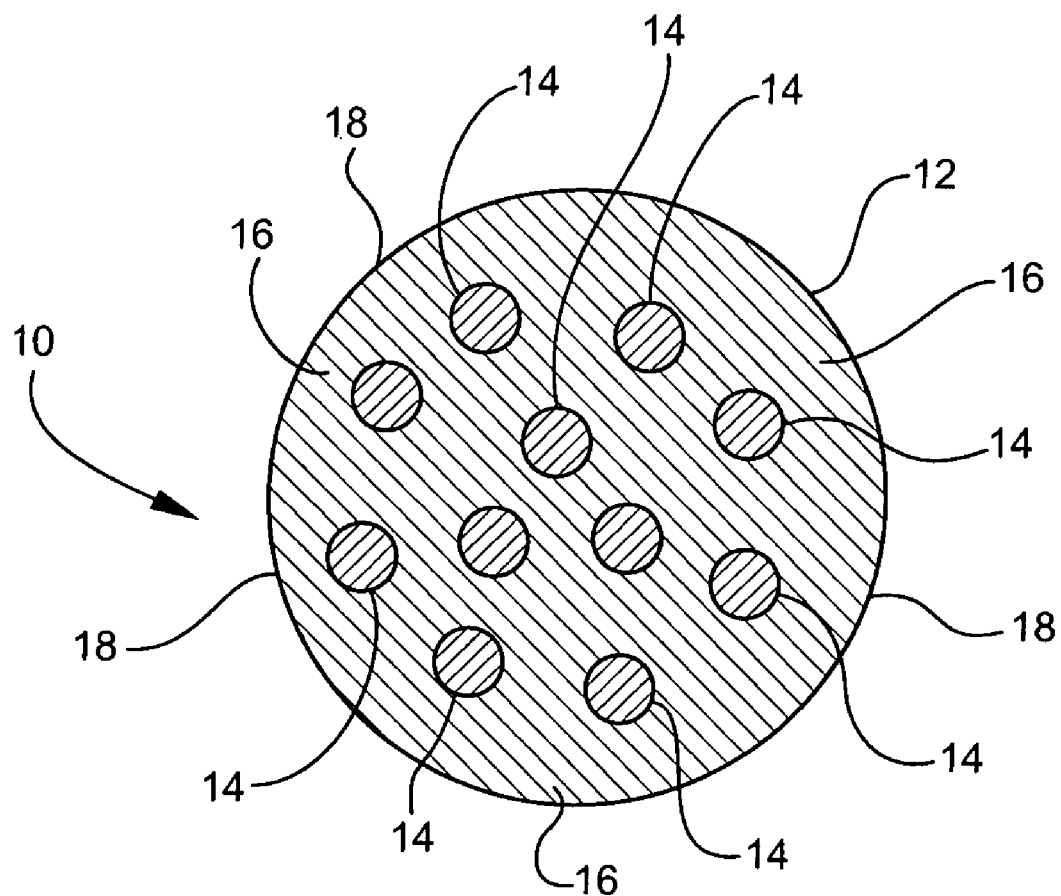
FIG. 1 is a cross-sectional view of a transparent, reinforced, composite fiber in accordance with one embodiment of the present invention.

Referring to FIG. 1, there is shown transparent, reinforced composite fiber 10 of the present invention. Fiber 10 comprises polymer 12 and fibrous polymeric reinforcement elements 14. In accordance with the invention, polymer 12 and fibrous polymeric reinforcement elements 14 are thermoplastic polymers that are transparent to visible light and can be processed into multi-component fibers using methods known in the polymer fiber industry. In a preferred embodiment, the aforesaid thermoplastic polymers are chosen from the group consisting of organic, semi-organic and inorganic polymers. Thus, these aforesaid thermoplastic polymers include, but are not limited, to polyolefin, poly (cyclo-olefin), polyamide, polycarbonate, acrylic, vinyl, polystyrene, polyurethane, polyimide, etc. Polymer 12 has a peripheral portion 16 that circumferentially extends about polymer 12 and defines outer surface 18.

In accordance with the invention, polymer 12 has a glass transition temperature and/or melting temperature that is relatively lower than the glass transition temperature and/or melting temperature of each fibrous polymeric reinforcement elements 14. Polymer 12 and fibrous polymeric reinforcement elements 14 are spun and highly drawn to maximize mechanical strength in the fiber direction, and arranged so that peripheral portion 16 and outer surface 18 of polymer 12 forms the peripheral portion and outer surface, respectively, of fiber 10. Such a configuration facilitates the consolidation process without disrupting the polymer chain orientation and mechanical properties of fibrous polymeric reinforcement elements 14 in the finished article or product, e.g. window, lenses, etc.

In accordance with one embodiment of the invention, the size of each fibrous polymeric reinforcement element 14 is very small in one dimension. Specifically, the size of each fibrous-polymeric reinforcement element 14, in one dimension, is relatively smaller than the wavelengths of visible light, e.g. 350-700 nanometers, so that the passage of visible light through the composite fiber 10 and the finished article or product is unimpeded even if the refractive indices of polymer 12 and the polymer of the reinforcement element 14 are different.

In accordance with another embodiment of the invention, the refractive index of the fibrous polymeric reinforcement element 14 is identical to, or nearly identical to, the refractive index of the polymer 12, so that the passage of visible light is unimpeded through the composite fiber 10 and the finished article or product e.g. windows, lenses, etc.

The content of polymer 12 and the polymer used to form fibrous polymeric reinforcement elements 14 may be varied from about 10% to about 90% of the total content of the composite fiber 10 and the selection of different polymer compositions can be used to tailor the physical and mechanical properties of the final transparent article.

Figure 2:
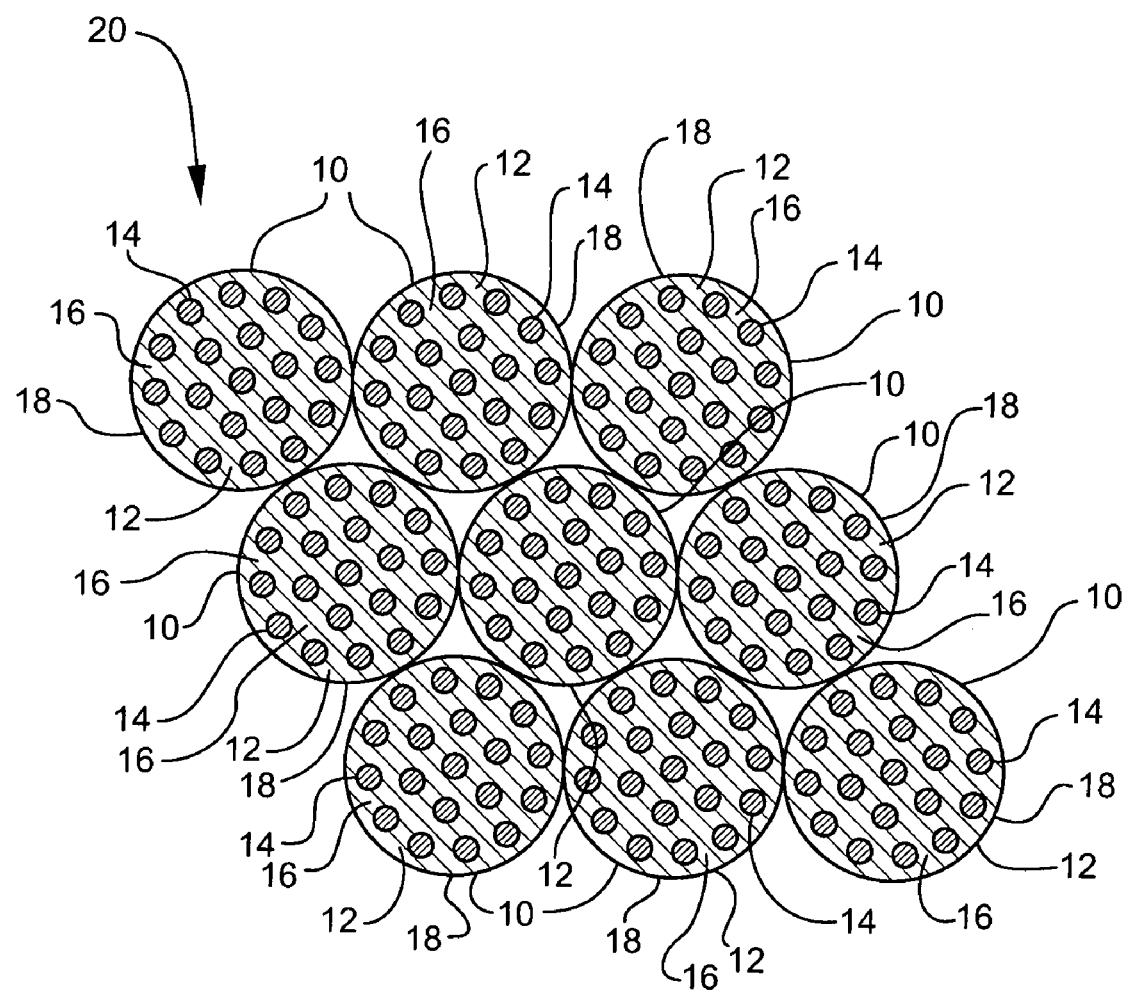
FIG. 2 is a cross-sectional view of an array formed with a plurality of the transparent, reinforced composite fibers of the present invention.
Figure 3:
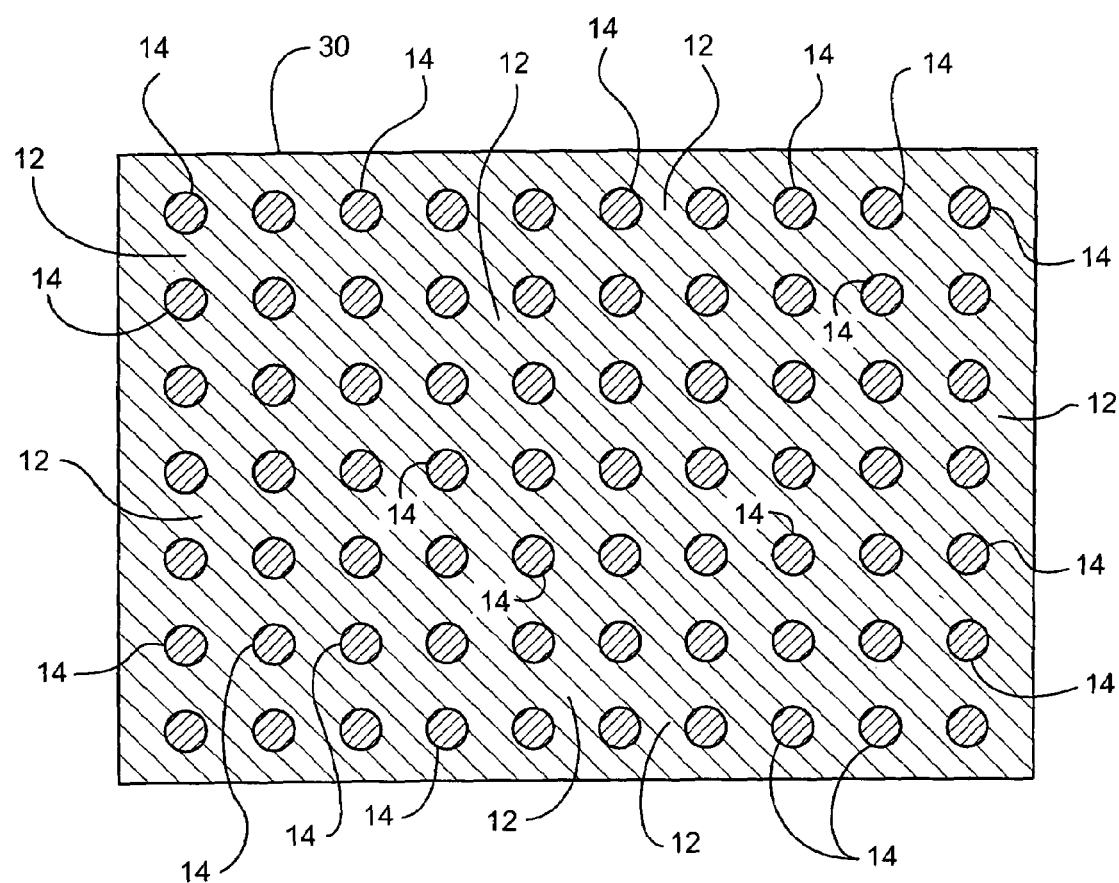
FIG. 3 is a cross-sectional view of a consolidated, transparent composite structure formed with a plurality of transparent, reinforced composite fibers of the present invention.

In a preferred embodiment of the invention, a transparent, polymer, reinforced composite article or product, e.g. windows, lenses, etc., is formed by applying a consolidation process to a plurality of fibers 10. The first step in creating a transparent, reinforced composite structure in accordance with this method is to form array 20 of fibers 10 as shown in FIG. 2. Next, array 20 is subjected to heat and pressure so as to yield a transparent, reinforced composite structure 30 which is shown in FIG. 3. As shown in FIG. 3, polymer 12 forms the outer surfaces and periphery of structure 30 as well as the portions of structure 30 that are between reinforcement elements 14. A variety of known techniques can be used to produce the heat and pressure needed to consolidate array 20 into transparent, reinforced, composite structure 30. The required pressure can be applied using known methods such as vacuum bagging. An autoclave or hydraulic press can also be used to provide the required pressure. The required heating can be accomplished with several known methods, including heated press platens (conduction), convection, microwave heating, radio frequency heating, inductive heating, radiant heating or resistive heating. Some of these known heating methods may require specific modifications to the material composition of array 20. For example, such modifications may consist of the addition of susceptor molecules or electrically conductive components to the polymers to absorb microwave radiation.

Fiber 10 allows for the fabrication of light-weight, low-density, transparent fiber-reinforced composite polymeric or "plastic" articles that have improved mechanical strength, improved impact resistance and improved toughness in comparison to prior art un-reinforced transparent polymers or plastics. Such articles include windows, lenses, glazing, eyeglasses, protective goggles, face shields, aircraft canopies and windshields, and specialty glazing for vehicles, aircraft and marine craft. Furthermore, the mechanical properties in finished articles fabricated with fiber 10 are significantly improved in comparison to transparent articles made from laminated polymer films. This is because the mechanical properties attained in a spun and drawn polymer fiber, as described in the foregoing description, are superior to the mechanical properties obtained with polymer films. Additionally, transparent articles made from fibers 10 are less dense than prior art transparent articles that use glass particles or glass fibers for reinforcement since glass is denser than polymers. Thus, transparent articles made from fibers 10 are lighter in weight in comparison to articles that use glass particles or glass fibers as reinforcement elements. The transparent articles made from fibers 10 are also superior to prior art glass-reinforced polymer or ceramic-reinforced polymer systems because each fiber 10 does not exhibit large differentials in the coefficients of thermal expansion of the polymers in fiber 10 which typically cause large internal stresses as a result of temperature changes.

The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for making a transparent, reinforced, composite, rigid structure, comprising:

providing a plurality of transparent, reinforced, composite polymeric fibers, each of said fibers comprising a polymeric body portion having a peripheral portion that defines an outer surface, and polymeric reinforcement elements embedded within said polymeric body portion such that said polymeric body portion extends between and about said polymeric reinforcement elements, said peripheral portion and outer surface of said polymeric body portion defining a peripheral portion and outer surface, respectively, of said transparent, reinforced, composite polymeric fiber;

arranging said plurality of fibers into an array wherein each of said plurality of fibers is arranged without any twisting together thereof;

bagging the arrayed plurality of fibers under low pressure; and applying heat and pressure, via a hydraulic press, to subject said array to compression to consolidate said array into a transparent reinforced, composite, rigid structure, said transparent, reinforced composite, rigid structure having a peripheral portion and outer surface formed by said polymeric body portion;

wherein said polymeric body portion comprises a first thermoplastic polymer selected from a first group of polymers consisting of polyolefin, polyamide, polycarbonate, acrylic, vinyl, polystyrene, polyurethane and polyimide and wherein each of said polymeric reinforcement elements comprises a second thermoplastic polymer that is a different thermoplastic polymer selected from the polymers of the first group of polymers than that of said first thermoplastic polymer and wherein the first and second thermoplastic polymers are transparent to visible light;

wherein said first thermoplastic polymer has a first predetermined glass transition temperature and/or melting temperature and said second thermoplastic polymer has second predetermined glass transition temperature and/or melting temperature that is relatively greater than said first predetermined glass transition temperature and/or melting temperature;

wherein each polymeric reinforcement element has one dimension thereof that is relatively smaller than the wavelength of visible light; and wherein the first thermoplastic polymer and said second thermoplastic polymer have the same, or very nearly the same, refractive index.

* * * * *